(12) United States Patent
Gesang et al.

(10) Patent No.: US 10,486,617 B2
(45) Date of Patent: Nov. 26, 2019

(54) EQUIPMENT BOX FOR THE SPARE-WHEEL WELL OF A MOTOR VEHICLE AND MOTOR VEHICLE WITH EQUIPMENT BOX

(71) Applicant: FORD GLOBAL TECHNOLOGIES, LLC, Dearborn, MI (US)

(72) Inventors: Ralph Georg Gesang, Kerpen (DE);
Christian Causemann, Cologne (DE);
Frank Schneider, Iserlohn (DE);
Jeannette Peter, Köln (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/967,130

(22) Filed: Apr. 30, 2018

(65) Prior Publication Data
US 2018/0334110 A1   Nov. 22, 2018

(30) Foreign Application Priority Data
May 18, 2017   (DE) .......................... 10 2017 208 389

(51) Int. Cl.
*B60R 11/06*   (2006.01)
*B60R 11/00*   (2006.01)
*B62D 43/10*   (2006.01)

(52) U.S. Cl.
CPC ....... *B60R 11/06* (2013.01); *B60R 2011/0012* (2013.01); *B62D 43/10* (2013.01)

(58) Field of Classification Search
CPC ............. B60R 11/06; B60R 2011/0012; B60R 2011/0036; B60R 2011/0094; B62D 43/10; B62D 43/06; B62D 43/005
(Continued)

(56) References Cited

U.S. PATENT DOCUMENTS 2,358,194 A * 9/1944 White .................... A45C 11/24
  206/527
2,391,347 A * 12/1945 Punte ................... B65D 47/265
  206/528

(Continued)

FOREIGN PATENT DOCUMENTS

DE   3904538 A1   8/1990
DE   4103652 A1   8/1992
(Continued)

OTHER PUBLICATIONS

English Machine Translation of DE10062689A1.
(Continued)

*Primary Examiner* — Corey N Skurdal
(74) *Attorney, Agent, or Firm* — Vichit Chea; King & Schickli, PLLC

(57) ABSTRACT

An equipment box, that may be stowed in the spare-wheel well of a motor vehicle, has a main body and a cover that can be attached thereto. The main body is formed for items of equipment to be received by a housing with at least one access opening. The cover can be attached to the main body in a supporting position and in a closing position, in which the cover in each case covers different regions of the main body. The cover in these two positions lies in the same plane, turned by an angle $\alpha$, and the cover in the closing position covers the entire main body, while in the supporting position it only covers a middle region of the main body and protrudes beyond the main body on opposite sides.

5 Claims, 7 Drawing Sheets

(58) Field of Classification Search
USPC ..... 224/42.14; 220/525, 781, 813, 821, 380, 220/499
See application file for complete search history.

(56) References Cited

U.S. PATENT DOCUMENTS

| | | | |
|---|---|---|---|
| 4,917,279 A | | 4/1990 | Brow et al. |
| 5,429,285 A | * | 7/1995 | Kim ................ B60R 11/06 206/373 |
| 5,577,629 A | * | 11/1996 | Rosler ............ B25H 3/023 220/345.3 |
| 2016/0280151 A1 | * | 9/2016 | Engerman .......... B60R 11/06 |

FOREIGN PATENT DOCUMENTS

| | | |
|---|---|---|
| DE | 10062689 A1 | 7/2002 |
| DE | 10257853 A1 | 7/2004 |
| EP | 0814005 A1 | 12/1997 |
| EP | 1870287 A1 | 12/2007 |

OTHER PUBLICATIONS

English Machine Translation of DE10257853A1.
English Machine Translation of DE3904538A1.
English Machine Translation of DE4103652A1.
English Machine Translation of EP0814005A1.
English Machine Translation of EP1870287A1.
"Compact Tyre Shaped Took Kit"; India Mart; https://www.indiamart.com/giftsmandienterprises/tool-kit.html#compact-tyre-shaped-tool-kit; pp. 1-9; printed Jan. 19, 2018.
"Other Car Interior Parts & Trims"; Ebay; https://www.ebay.co.uk/b/Other-Car-Interior-Parts-Trims/9887/bn_876623?_trksid=p2047675.m4096.I9147; pp. 1-5; printed Jan. 19, 2018.
2011 04 Peugeot RCZ 1.6 Petrol Coupe Spare Wheel Replacement Tool Box; Ebay; https://www.ebay.ie/sch/sis.html?_nkw=2011%2004%20Peugeot%20RCZ%201%206%20petrol%20coupe%20spare%20wheel%20replacement%20tool%20box&_itemId=291666567207; pp. 1-15; printed Jan. 19, 2018.

* cited by examiner

EQUIPMENT BOX FOR THE SPARE-WHEEL WELL OF A MOTOR VEHICLE AND MOTOR VEHICLE WITH EQUIPMENT BOX

TECHNICAL FIELD

This document relates to an equipment box for the spare-wheel well of a motor vehicle as well as to a motor vehicle with such an integrated equipment box.

BACKGROUND

In the area of motor vehicles, it is known to keep equipment boxes or tool boxes in a space-saving manner in the area of a spare wheel or a spare-wheel well. In such cases, the shape of such tool boxes is often adapted to the geometry of the spare wheel or the spare-wheel well to allow it to be placed in an exactly fitting and space-saving manner. The handling of a tool box with lids, handles or grips, closures, etc., is also adapted to this particular installation situation to enable a user to remove, put away and use the tool box as easily as possible.

For example, DE 39 045 38 A1 discloses a hinged tool box which consists of two shell halves that are connected to one another by way of a hinge. Altogether, this produces a tool box with the shape of a semicircle. This semicircular shape is adapted to the spare-wheel compartment of a motor vehicle, so that the tool box can be put away in an exactly fitting manner in a spare-wheel compartment. DE 41 036 52 A1 on the other hand discloses an on-board tool box for keeping in the nave of the rim of the spare wheel. U.S. Pat. No. 4,917,279 also discloses a tool box that can be stored in a spare-wheel well.

At the same time, not only tool boxes with on-board tools but also tire repair kits can be kept in this way. For example, it may be provided that a motor vehicle is equipped with a tire repair kit instead of a spare wheel. The loading area in the trunk of a motor vehicle is however often reinforced and supported by a spare wheel put away in it. If, instead, a tire repair kit is put away in the spare-wheel well, other components must be provided for such support.

Usually, boxes that can be put away in the spare-wheel well in an exactly fitting manner are used for this. Along with equipment for repairing a tire, towing hooks and/or funnels for filling with fuel may be kept in such boxes, so that they are referred to generally as equipment boxes. Expanded polypropylene (EPP) is used for example as the material for such equipment boxes.

However, one problem with such equipment boxes is caused by their dimensions, required for fitting a box exactly in a spare-wheel well. To reinforce the loading area sufficiently, such equipment boxes typically fill the spare-wheel well completely. This has the effect however that it is only with difficulty that the equipment boxes can be removed from the spare-wheel well when they are to be used outside the vehicle, or a user would like to use the spare-wheel well as additional storage space for keeping other items. Such equipment boxes are heavy, large and unwieldy.

In view of the prior art identified, the area of the equipment boxes in spare-wheel wells of motor vehicles therefore leaves scope for improvements to be made.

SUMMARY

It is an object hereof to provide an equipment box for putting away in the spare-wheel well of a motor vehicle that can contribute to supporting the loading area of a trunk of the motor vehicle. At the same time, it is intended that the equipment box can be easily removed from the spare wheel and kept elsewhere, in order to be able if required to use the spare-wheel well as a storage space for other items. The object is achieved by an equipment box with the features of the following claims.

It should be pointed out that the features and measures individually presented in the description that follows can be combined with one another in any desired, technically meaningful way and show further designs of the equipment box. The description additionally characterizes and specifies the equipment box in particular in connection with the figures.

The equipment box is designed for putting away or stowing in the spare-wheel well of a motor vehicle and has a main body and a cover that can be attached thereto. The main body is formed for items of equipment to be received by a housing with at least one access opening. At the same time, a number of storage compartments in which items can be put away may be provided. A number of receiving recesses in which items can be clamped are preferably provided. This prevents unwanted movement of the items within the main body. As in the case of already known tool boxes, the shape of these receiving recesses may be adapted to the items to be received, so that only certain items of equipment can be exactly fitted in.

The cover can be attached to the main body in a supporting position and in a closing position. In these two positions, the cover in each case covers different regions of the main body. In the two positions, the cover lies in the same plane, turned by an angle $\alpha$. The cover is consequently not pivoted between two positions like a hinged lid, but brought into the other position, respectively, by turning in one plane. The cover in the closing position covers the entire main body with the at least one access opening, while the cover in the supporting position only covers a middle region of the main body and protrudes beyond the main body on opposite sides. In the first, closing position, the cover consequently forms a lid for the entire main body, and a compact equipment box that can easily be removed from the spare-wheel well and stored elsewhere is formed. In this case, coverage of the entire main body means that it is covered by the cover, and storage compartments are closed, substantially completely. In other possible embodiments, almost complete coverage is provided. For example, narrow peripheral regions may remain uncovered.

In order to bring the cover out of this closing position into the supporting position, the cover is turned by a certain angle $\alpha$ in the same plane and attached to the main body in this position. In this position, the cover covers only a middle region of the main body and otherwise protrudes from the main body on opposite sides. Preferably, the angle $\alpha$ is approximately 90°, so that the main body and the cover form a cross in the supporting position. In this supporting position, the cross-shaped equipment box in the spare well can support the loading area lying thereunder over a large surface area. However, different angles $\alpha$ other than 90° are also possible.

The cover is therefore preferably designed as a separate component, which can be attached to the main body at least in the two positions mentioned. There may however also be further separate components that can be attached to the main body, but in the case of the equipment box disclosed herein it is an at least two-part box.

With this two-part equipment box, various functions can be performed. If the cover is brought into the supporting position, the equipment box within a spare-wheel well can be advantageously used to support a loading area lying thereover. The cross shape of the equipment box that is preferably produced in the supporting position makes support possible over a larger area, the loads being evenly distributed. Furthermore, the sectors of a circle between the main body and the cover protruding from it can be used as storage space for small items.

If the equipment box is to be removed, the cover is brought into the closing position and a lightweight, compact equipment box that can be easily removed from the spare-wheel well is obtained. This equipment box can be stored well, since it does not take up much space and does not have a large diameter like many known tool boxes for spare-wheel wells. The equipment box can be put away on a shelf, but it is also possible for it to be kept in a space-saving manner in the vehicle. The narrow box shape of the equipment box makes it possible for it to be kept within the passenger compartment, for example under the armrest of a rear seat.

Furthermore, the equipment box may also be used for other purposes. For example, a person can sit or kneel on it while carrying out repairs on the vehicle, in particular the repair of a tire. In order to provide a comfortable seat, in one embodiment of the equipment box it is provided that the cover can be attached to the main body in a third position, in which it does not close the at least one access opening of the main body but protrudes from it at an angle β of approximately 90° in an end region of the main body. In this way, an L-shaped seat is formed and a person can sit on the main body. Preferably, for this purpose the main body is turned with its at least one access opening downward. If receiving recesses are used for receiving items of equipment, the items of equipment do not fall out, but are held in the recesses by clamping force. The side of the main body that is then lying on top is expediently of a relatively straight and smooth design, so that a person can comfortably sit on it. The cover protruding approximately perpendicularly upward is attached to the main body in such a way that it forms a rest on which a person can lean.

The cover preferably has an elongate covering plate with two longitudinal sides and two end regions with respective end faces. A number of side elements protrude from these end regions. These side elements serve the purpose of connecting the cover to the main body. This can take place in various ways. For example, in opposite end regions of the cover plate two side elements in each case protrude in the same direction, and in the closing position the side elements are in interlocking contact with the main body. In particular, the side elements may be plates which in the closing position lie against the outer side of the main body. The side elements in this case protrude for example from the longitudinal sides of the cover plate. They may however also protrude from the end faces.

The side elements could also have any other shapes that are suitable for connection to the main body. For example, they may also be ridges or pins. In the closing position, plates, ridges and/or pins can lie against the outer side of the main body, so that the cover as it were encloses the main body. For a stable cover, the side elements may latch in on the main body. For this purpose, corresponding latching elements protrude from the main body. The side elements may also engage in corresponding receptacles within the main body. They may likewise engage in a latching manner there.

The covering plate of the cover is preferably configured as smooth and without elevations, in order to offer a level bearing surface for the loading area of a vehicle trunk.

In one embodiment of the equipment box, the width $B_A$ of a first end region of the cover plate is greater than the width $b_A$ of an opposite second end region of the cover plate, and the width of a first end region of the main body is likewise greater than the width of an opposite second end region of the main body. In the closing position, the narrower end of the cover lies on the narrower end of the main body.

In the supporting position, the cover lies transversely on the middle region of the main body, this region being correspondingly designed for this. For example, receptacles in which components of the cover engage may be provided in this middle region. In one embodiment of the equipment box, the middle region is delimited at least by two transverse walls, between which the cover in the supporting position is held in an interlocking manner in the longitudinal direction of the main body. In this way, the cover cannot shift in the longitudinal direction of the main body. In order also to prevent, or at least restrict, movement of the cover in the transverse direction of the main body, the side elements of the cover may be designed and arranged in such a way that in the supporting position they likewise lie against the outer side of the main body. For example, for this plates or ridges in the middle region of the cover are arranged in such a way that they lie against the outer side of the main body when the cover is placed centrally onto the main body. Also for this, receptacles in which the side elements engage in the supporting position may be provided on the main body.

This document also discloses a motor vehicle with a spare-wheel well and an equipment box according to one of the embodiments described herein being put away in the spare-wheel well. To be able to put the equipment box away in the spare-wheel well in an exactly fitting manner, the longest dimensions of the main body and of the cover respectively correspond to the inside diameter of the spare-wheel well, or the dimensions are only slightly smaller than the inside diameter of the spare-wheel well. The equipment box with the advantages described can be used in the case of such a motor vehicle. In particular, a motor vehicle with more available storage space within the spare-wheel well is obtained. As a result, the space within the spare-wheel well can be officially ascribed to the loading volume of the vehicle.

BRIEF DESCRIPTION OF THE DRAWING FIGURES

Further advantageous designs of the equipment box are disclosed in the following description of the figures, in which.

In the various figures, the same parts are always provided with the same designations, for which reason they are generally also only described once.

DETAILED DESCRIPTION

Figure 1:
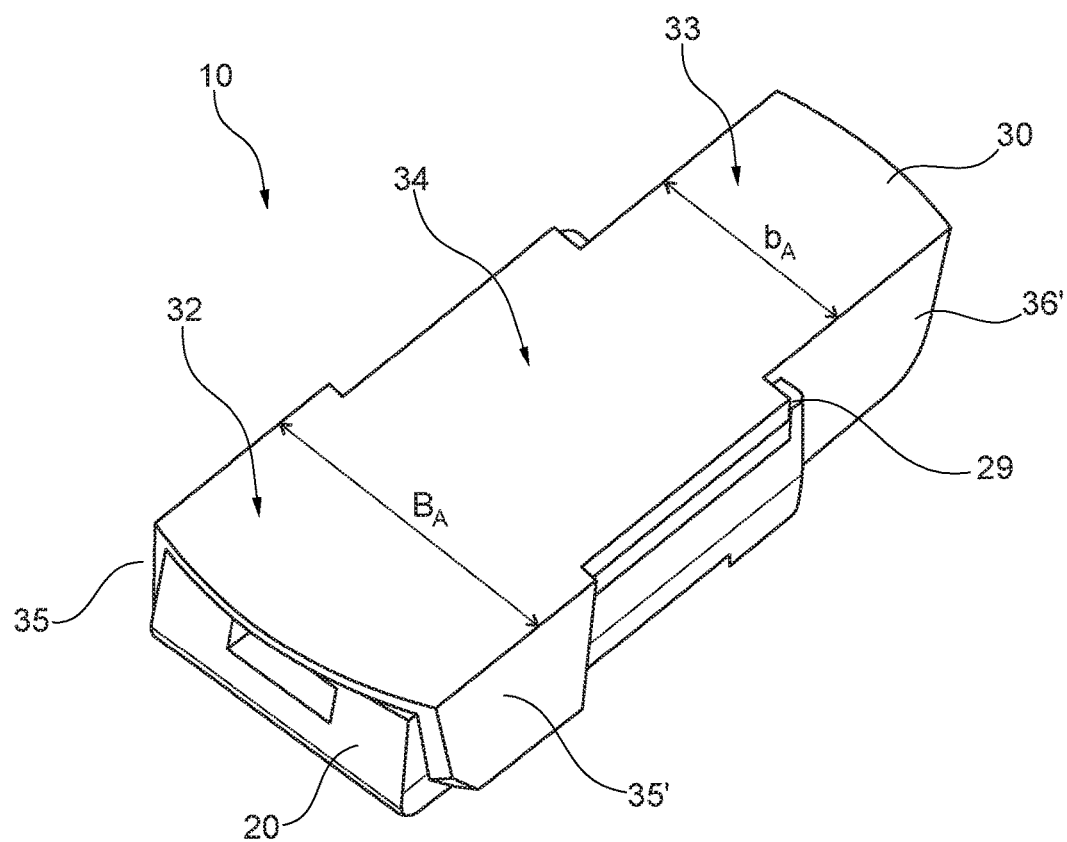
FIG. 1 shows a three-dimensional view of an embodiment of the new and improved equipment box with a cover in the closing position.
Figure 2:
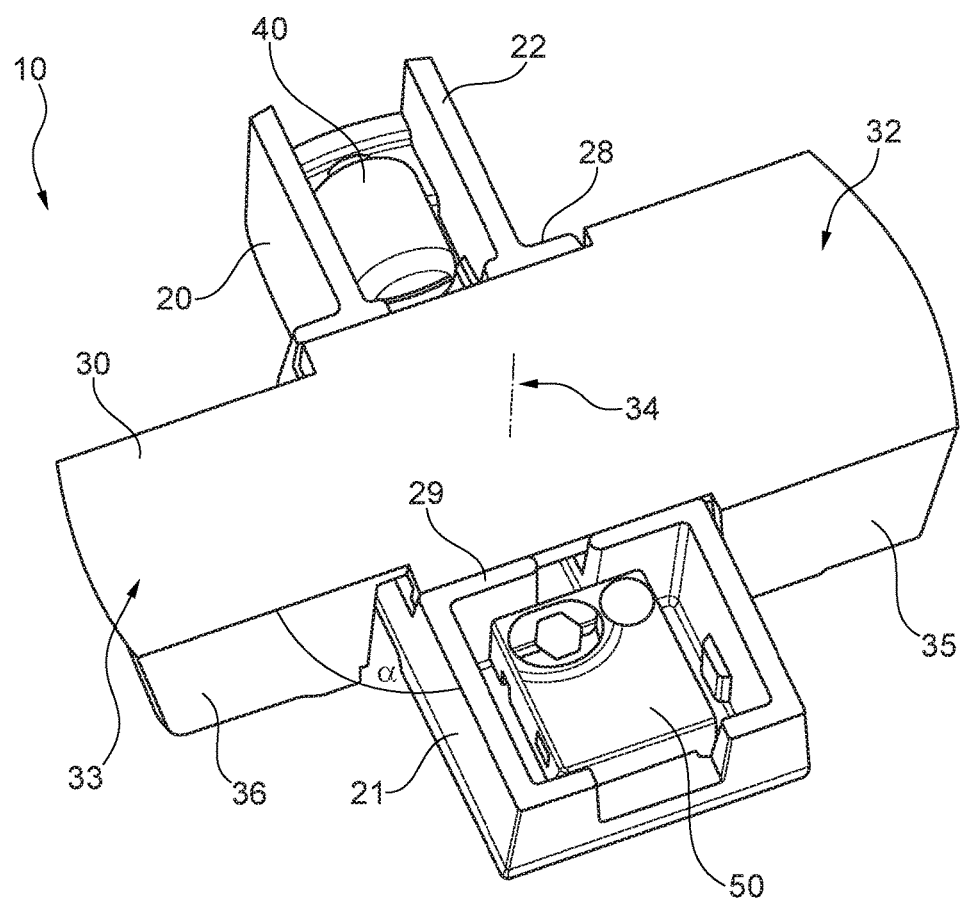
FIG. 2 shows an equipment box according to FIG. 1 with a cover in the supporting position.

FIG. 1 shows an embodiment of the equipment box 10, having a main body 20 and a cover 30. In this case, the equipment box 10 is shown in a state in which the cover 30 covers the main body 20 substantially completely, and thus forms a lid. In this state, the cover 30 is in the closing position with respect to the main body 20. By contrast, FIG. 2 shows the equipment box 10 in the supporting position.

The main body 20 is formed by an elongate, box-shaped housing, the cover 30 having a covering plate which is adapted to the shape of the main body 20 in order to be able to cover it substantially completely in the closing position. The covering plate has a first end region 32 and a second end region 33. In these end regions 32, 33, a number of side walls protrude from the longitudinal sides of the cover 30 in the direction of the main body 20. In the end region 32, the two side walls 35 and 35' protrude from the opposite longitudinal sides of the cover 30, while the two side walls 36 and 36' protrude from the other end region 33 (also see FIGS. 4A and 4B).

The width $B_A$ of the end region 32 is in this case greater than the width $b_A$ of the other end region 33 of the cover. This also applies to the corresponding end regions of the main body, so that the equipment box 10 as a whole is of different lengths at its two longitudinal ends. The middle region 34 lying between the two end regions of the cover 30 has a middle width, which lies between the widths $B_A$ and $b_A$.

Figure 3:
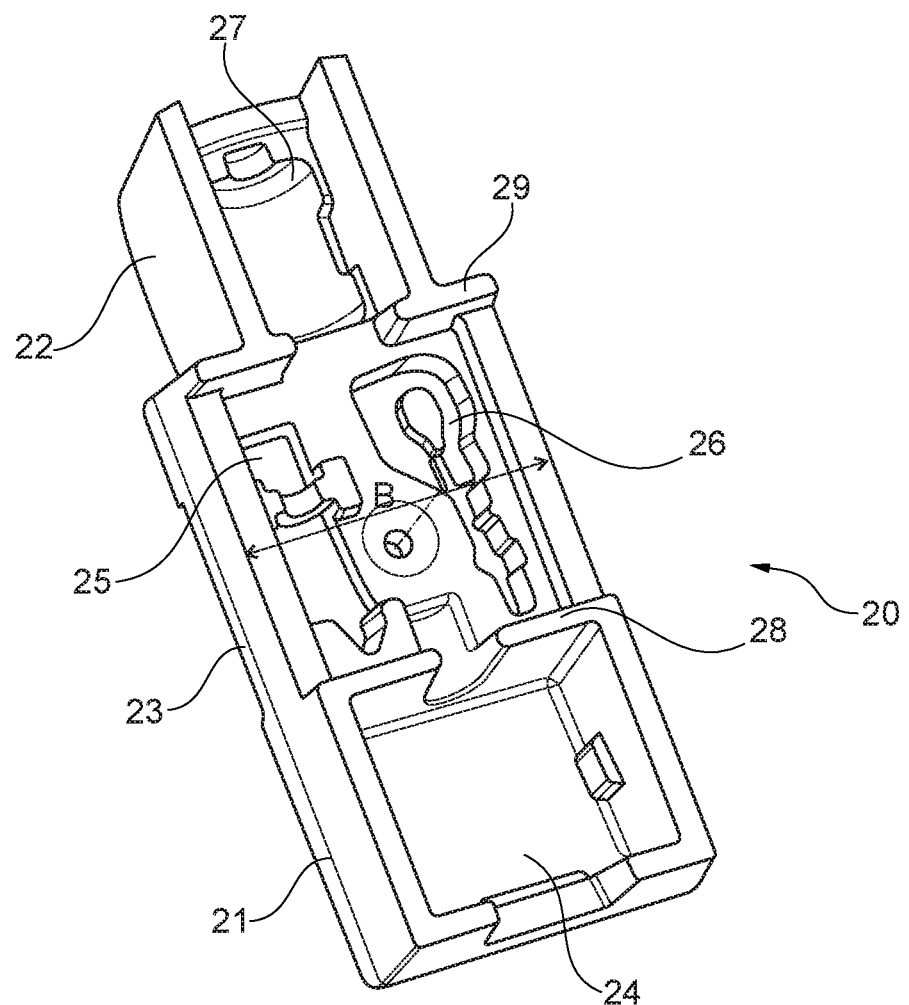
FIG. 3 shows a three-dimensional view of the upper side of a main body.

FIG. 3 shows the main body 20 in a view from above into the interior of the main body 20. The main body 20 has a middle region 23, which is adjoined by two opposite end regions 21 and 22. A number of storage compartments may be provided in these various regions. In the embodiment of FIG. 3 there is in the end region 21 a receiving recess 24 for receiving relatively large cuboidal items. The item concerned here may be for example a compressor 50, as can be seen in FIG. 2. In the other end region 22 there is formed a further receiving recess 27, in which for example a bottle 40 with a puncture sealing compound can be stowed (see FIG. 2). Further receiving recesses 25 and 26 are provided in the middle region 23. The receiving recess 25 is formed for receiving a funnel, while the receiving recess 26 is designed for receiving a towing hook.

The shape and arrangement of the receiving recesses 24, 25, 26 and 27 should however be understood as only given by way of example and any other shapes of receiving recesses, storage compartments, etc. may be provided. In any event, the main body 20 is however formed by a housing with at least one access opening, through which an item can be put away in the housing. If the cover 30 is in the closing position, as in FIG. 1, this access opening is covered, so that the cover 30 acts as a lid. In the exemplary embodiment of the figures, in the closing position the cover 30 covers all of the receiving recesses 24, 25, 26 and 27.

Figure 5:
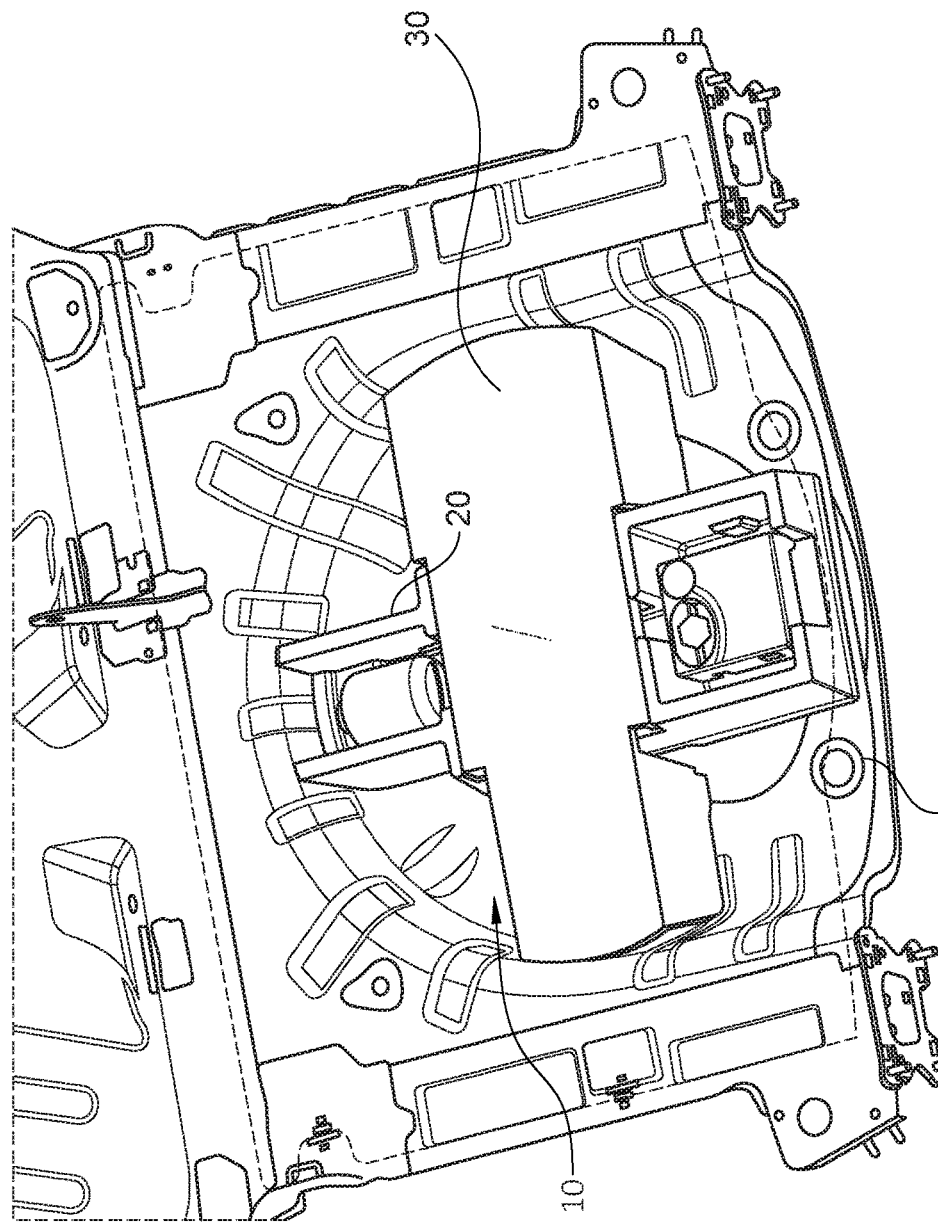
FIG. 5 shows a plan view of a spare-wheel well with an equipment box put away.

In the supporting position of FIG. 2, the cover 30 merely covers the middle region 23 of the main body 20. For this, the cover 30 is turned by 90° with respect to its position in FIG. 1 and is placed centrally onto the main body 20. The end regions 32 and 33 of the cover 30 protrude beyond the main body 20, so that the main body 20 and the cover 30 in the supporting position form a cross. In this position, the equipment box 10 can be put away in the spare-wheel well 60 of a motor vehicle, as is shown in FIG. 5. The length of the main body 20 and of the cover 30 corresponds approximately to the inside diameter of the spare-wheel well 60, in order that the equipment box 10 fits exactly in the spare-wheel well 60 and does not move around in any significant way.

Figure 4A:
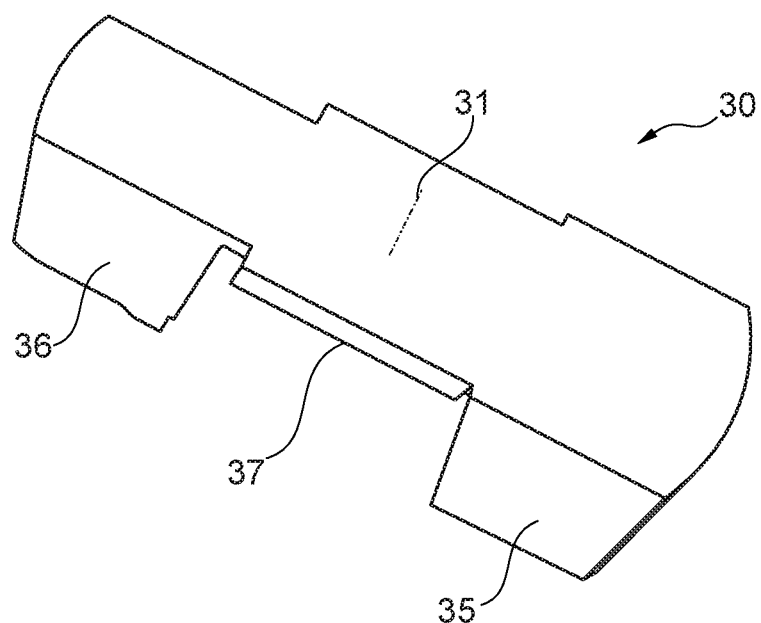
FIG. 4A shows a three-dimensional view of a cover from its upper side.
Figure 4B:
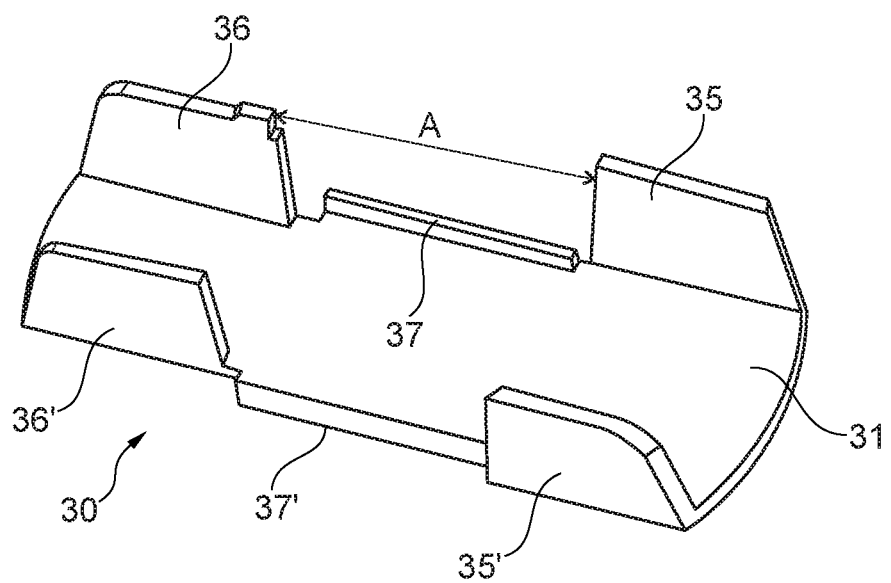
FIG. 4B shows a three-dimensional view of the cover according to FIG. 4A from its underside.

To make it easier for it to be put away in the spare-wheel well 60 in such an exactly fitting manner, the lower edges of the main body 20 and of the cover 30 are designed as sloping or rounded in their respective end regions. The end faces of the cover 30 are also of a rounded design, with a radius that is adapted to the radius of the spare-wheel well 60. FIGS. 4A and 4B show for example two views of the cover 30, from which the rounded end faces and the sloping side walls 35, 35', 36 and 36' can be seen. These side walls 35, 35', 36, 36' protrude on opposite longitudinal sides of a covering plate 31 from said sides. The protruding length of the side walls 35, 35', 36, 36' corresponds approximately to the height of the main body 20.

Also provided in the middle region of the covering plate 31 are two narrower retaining walls 37 and 37', which likewise protrude from the longitudinal sides of the covering plate 31. In the supporting position of the cover 30, these retaining walls 37, 37' lie against the transverse walls 28, 29 of the main body 20 from the inside (see FIG. 2). Thus, in the supporting position, the cover 30 is secured against slipping in the longitudinal direction of the main body 20. However, other means, such as pins in holes, latching means, etc. could also be used for this purpose.

The distance A between the side walls 35, 35' and the side walls 36, 36' is greater than the width B of the main body 20 in its middle region 23, in order to allow the main body 20 in the supporting position to be received between opposite pairs of side walls. In this case, the distance A may be only slightly greater, whereby the edges of the side walls 35, 35', 36, 36' lie against the underside of the main body. In the embodiment of the figures, the distance A is much greater than the width B of the main body 20, so that there is a certain amount of play. The cover 30 can therefore be moved back and forth in the transverse direction of the main body 20.

Figure 6:
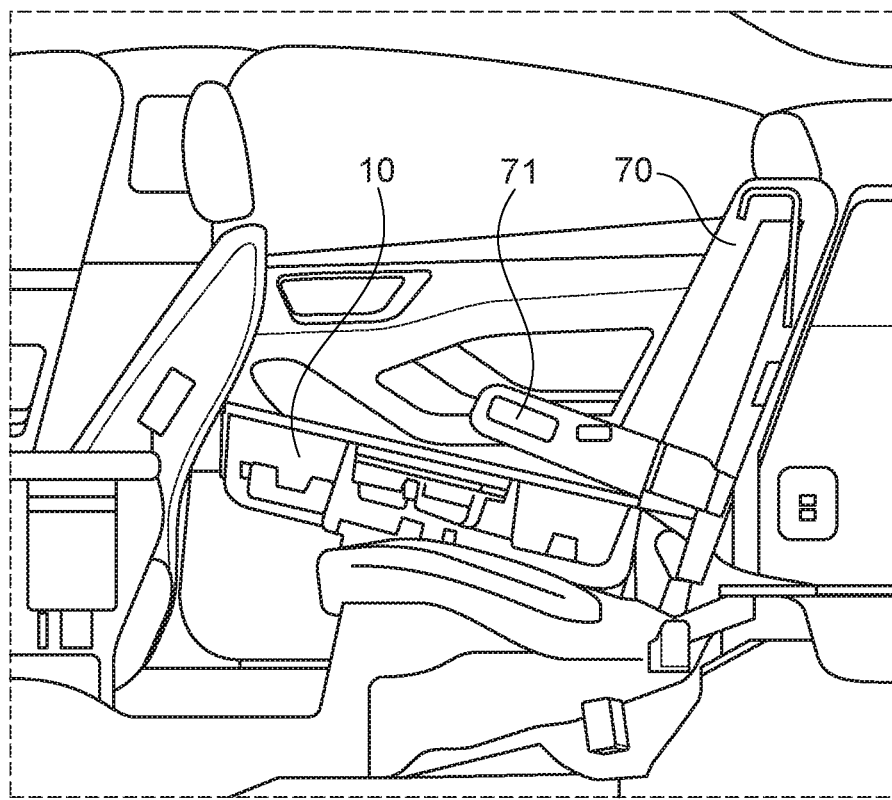
FIG. 6 shows a side view of a rear seat with an equipment box stowed away.

If the equipment box is to be removed from the spare-wheel well 60, the cover 30 is turned by 90° and placed onto the main body 20 again. In order to fix the cover 30 securely on the main body 20 in this closing position, latching elements or other fastening means may be provided (not shown). Furthermore, handles or grips or indentations for better gripping the equipment box are provided. If the equipment box 10 is removed from the spare-wheel well 60 in the closing position of FIG. 1, it can be stowed away or used in a variety of ways. On account of its cuboidal shape and its compactness it can be stored well on a shelf or in a cupboard. It can however also be kept in the vehicle. FIG. 6 shows for example it being kept underneath the armrest 71 of a rear seat 70. In this way, the equipment box continues as before to be available, but the free space in the spare-wheel well 60 to be used as additional storage space for other items, such as for example baggage.

Figure 7:
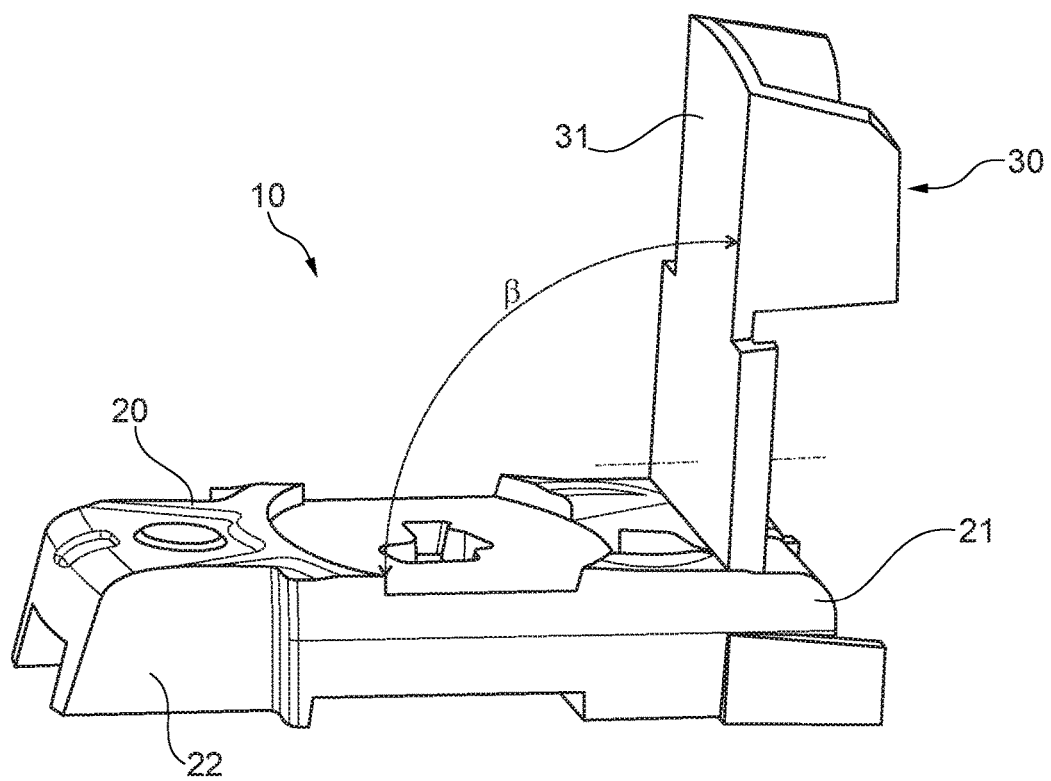
FIG. 7 shows an equipment box with a cover in a third position as a backrest.

FIG. 7 shows by way of example a further use of the equipment box 10, in which the cover 30 is attached to the main body 20 in a third position. In this case, the cover 30 is attached to the main body 20 at an end region 21 of the main body 20 at an angle β. The main body 20 in this case faces with its receiving recesses downward, so that its underside faces upward. This underside forms a relatively level surface, which a person can use as a seat. The angle β is approximately 90° or somewhat more, so that the cover 30 forms a backrest against which a person can lean. For this purpose, the side walls of the cover 30 are directed away from the main body 20. The cover 30 is connected to the main body 20 by being inserted, for example by means of a dovetail design, while a clipped connection is also conceivable.

What is claimed:

1. An equipment box, comprising:
a main body including a housing having an access opening; and
a cover, said cover being attachable to said main body in a supporting position and in a closing position, said cover covering all of said main body in said closing position and said cover covering only a middle region of said main body and protruding beyond said main body on opposite sides in said supporting position wherein (a) the cover has an elongate covering plate with two longitudinal sides and two end regions with respective end faces, and side elements protrude from said end regions, (b) in said end regions two of said side elements protrude in a same direction, and in the closing position the side elements are in interlocking contact with the main body, (c) the side elements are formed by plates which in the closing position lie against an outer side of the main body, (d) the side elements protrude from longitudinal sides of a covering plate and (e) a width $B_A$ of a first of said end regions of the covering plate is greater than a width $b_A$ of a second of said end regions of the covering plate, and the width of a first end region of the main body is likewise greater than the width of an opposite end region of the main body.

2. The equipment box as claimed in claim 1, wherein the middle region of the main body is delimited at least by two transverse walls, between which the cover in the supporting position is held in an interlocking manner in a longitudinal direction of the main body.

3. The equipment box as claimed in claim 2, wherein in a third position the cover is attached to the main body and does not close the access opening of the main body, but protrudes from the main body at an angle β of approximately 90° with said first end region of the main body.

4. The equipment box as claimed in claim 3, wherein the main body has a number of receiving recesses receiving items of equipment in an exactly fitting manner.

5. A motor vehicle, comprising:
a spare-wheel well; and
an equipment box stowed in said spare-wheel well, said equipment box including (a) a main body including a housing having an access opening and (b) a cover wherein said cover is attachable to said main body in a supporting position and in a closing position, said cover covering all of said main body in said closing position and said cover covering only a middle region of said main body and protruding beyond said main body on opposite sides in said supporting position and wherein longest dimensions of said main body and of said cover respectively correspond to an inside diameter of said spare-wheel well.

* * * * *